though the power plant through this provision of
UNITED STATES PATENT OFFICE.

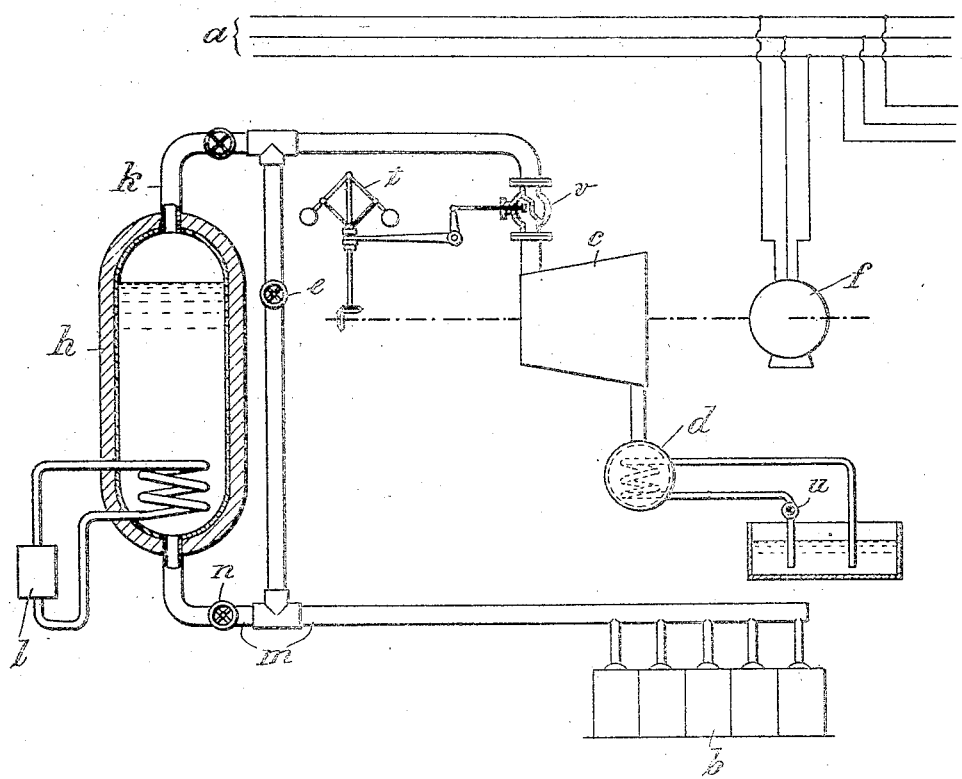

JOHANNES KARL RUTHS, OF DJURSHOLM, SWEDEN, ASSIGNOR TO AKTIEBOLAGET VAPORACKUMULATOR, OF STOCKHOLM, SWEDEN.

SUPPLEMENTARY POWER PLANT FOR ELECTRIC CENTRALS.

1,366,215.    Specification of Letters Patent.    Patented Jan. 18, 1921.

Original application filed August 5, 1916, Serial No. 113,395. Divided and this application filed September 26, 1918. Serial No. 255,878.

*To all whom it may concern:*

Be it known that I, JOHANNES KARL RUTHS, subject of the King of Sweden, residing at Djursholm, in the Kingdom of Sweden, have invented certain new and useful Improvements in Supplementary Power Plants for Electric Centrals, of which the following is a specification.

In order to overcome disturbances in the delivery of power or meet temporary overloads in electric stations or the like plants, equipped with steam reserve boilers, I have proposed to provide the plant with a heat storer, the water-space of which is connected with the steam-space of the supplementary boiler through a pipe which can be closed off, so that the plant can be operated with the supplementary boilers or with the heat storer. If desired, a turbine then can be driven from the heat storer. Such an arrangement is disclosed in my co-pending application, Ser. 113,395, filed Aug. 5, 1916, of which application this is a division. Though the power plant through this provision of a heat storer always will be kept ready for use without keeping the boilers constantly under fire and under pressure a certain time will, however, be wasted before the turbine can be put in action.

By the present invention this inconvenience will be avoided and a real momentary reserve obtained so that no disturbance at all will be perceivable by the consumers. Through this arrangement the transformation hitherto necessary for three-phase current into direct current as well as the use of lead accumulators are avoided, as the momentary reserve in three-phase-plants will act in exactly the same manner as the lead accumulator in direct current plants. It is obvious, that nothing will prevent the use of this arrangement in plants of the kind last mentioned.

According to my present invention this is effected in the following manner. The electric generator, driven by the steam-turbine is normally running as a synchronous motor, thus driving the steam turbine idly, while in case of a disturbance this synchronous motor will run as a generator.

On the drawing $c$ indicates the steam-motor—for instance a turbine, driving the generator $f$. $b$ is the steam boiler battery and $h$ the heat storer, consisting of an insulated receptacle containing water. Said storer through a pipe $m$ provided with a valve $n$, is charged from the boiler. From the steam-space of the heat-storer a pipe $k$ leads to the turbine $c$. The exhaust steam of the turbine $c$ is supplied to the condenser $d$.

The generator $f$ is constantly connected to the power lines $a$ and runs normally as a synchronous motor, while the turbine $c$ is running idle. In order to diminish the stray power of the turbine, a vacuum is effected in its casing in that the inlet valve of the turbine is provided with a little opening or a narrow by-pass, through which is supplied the little amount of steam, necessary for the cooling of the turbine and tightening of the stuffing-box.

$t$ is a centrifugal governor, controlling the valve body of the admission valve $v$.

The circulating pump $u$ of the condenser $d$ may be constantly running. It is, however, more suitable to start it automatically as soon as the turbine $c$ overtakes the driving of the generator $f$, while usually a smaller pump supplies the small quantity of cooling water, necessary for the maintenance of the desired vacuum. The air-pump of the condenser must be kept constantly running.

If a disturbance takes places in the plant, owing to a disturbance in the operating of a motor, a disturbance in the power network or an instantaneous unexpected overload, the frequency of the network will be more or less rapidly diminished according to the size of the total masses, working into the network. The connection between the generator $f$ and the network will, however, remain unbroken. The governor $t$ will be put into action and opens at once the admission valve $v$ to the turbine $c$, arranged in the pipe $k$, so that steam from the heat-storer $h$ will enter the turbine $c$ and the latter will supply the lack of power.

In a disturbance of longer duration the steam boiler battery $b$ at once will be heated. As soon as the boilers can deliver the steam as required, the valve $e$ will be opened, so that the turbine $c$ can be driven with live-steam. The pipe $e$ opens suitably in the pipe $k$ in front of the valve $v$ as is shown. When the disturbance has ceased the heat storer preferably will be again charged with steam from the boiler $b$ through the piping $m$.

In order to compensate for the losses by radiation from the heat storer $h$, a small heating apparatus $l$ is arranged, that maintains the water in the heat storer at such a temperature as corresponds to the pressure wanted. The said heating apparatus can be so dimensioned that after a short drawing-off of steam from the storer $h$ the pressure in the same will be restored by means of said apparatus. For meeting of the losses an electric heating may be provided.

It is evident that the heat storer $h$ may also be used for supplying an occasional lack of power during the normal operation. It then works entirely as during a disturbance. If in this case, steam is drawn off in comparatively large quantities at various times from the heat storer $h$, one can in order to again charge the heat storer $h$ use one or more of the boilers of the reserve steam boilers $b$, if the heating apparatus $l$ is not sufficient.

In the direct pipe from boiler to turbine an additional high pressure turbine may be inserted in order to better utilize the difference in pressure between the boiler and the low-pressure turbine. The low-pressure turbine then first will be supplied with steam from the heat storer and finally with exhaust-steam from the high-pressure turbine. It is evident the two turbines may form different stages of one and the same turbine. In this case only one generator is necessary.

I claim:—

1. In a reserve power plant for electric power stations the combination with an electric generator, of a steam generator normally out of operation, a steam storer containing water of a temperature above the boiling point, steam connections between the latter and the said steam generator, a steam-turbine and steam connections between the latter and the said steam storer and the said steam generator respectively, the arrangement being such that the said electric generator normally runs as a synchronous motor driving the steam turbine idly, while in case of a disturbance producing a decrease in the frequency of the E. M. F. the electric generator is operated as a generator, the said steam-turbine being supplied with steam from said steam-storer.

2. In a power plant as specified in claim 1, a normally closed shut-off valve in the steam connection between the heat-storer and the steam-turbine, and a governor adapted to open said valve upon a decrease in the number of revolutions of the electric generator when running as a synchronous motor.

In testimony whereof I affix my signature in presence of two witnesses.

JOHANNES KARL RUTHS

Witnesses:
GRETA PRIM,
LIBOTH FREDRICSSON.